United States Patent [19]
Clausen

[11] 4,091,163
[45] May 23, 1978

[54] FUSED SILICA ARTICLE HAVING TITANIA-SILICATE BARRIER ZONE

[75] Inventor: Edward M. Clausen, Eastlake, Ohio

[73] Assignee: General Electric Company, Schenectady, N.Y.

[21] Appl. No.: 725,961

[22] Filed: Sep. 23, 1976

Related U.S. Application Data

[62] Division of Ser. No. 478,926, Jun. 13, 1974, Pat. No. 3,988,628.

[51] Int. Cl.$^2$ .......................... B05D 3/02; B05D 5/06; B32B 17/06

[52] U.S. Cl. .................................... 428/336; 427/160; 427/167; 427/255; 428/428; 428/432

[58] Field of Search ........................ 427/160, 167, 255; 428/336, 428, 432

[56] References Cited

U.S. PATENT DOCUMENTS

| | | | |
|---|---|---|---|
| 3,161,537 | 12/1964 | Dettre et al. | 427/255 |
| 3,352,708 | 11/1967 | Lyon et al. | 427/255 X |

*Primary Examiner*—James R. Hoffman
*Attorney, Agent, or Firm*—Ernest W. Legree; Lawrence R. Kempton; Frank L. Neuhauser

[57] ABSTRACT

A titania-silicate glass zone or layer is formed at the surface in fused silica by first applying a thick opaque polycrystalline titania powder coating to the silica and then fusing the coating into the silica at a high temperature. Such a zone reduces the ultraviolet transmission of the silica and also lowers its sodium ion conductivity. The zone may usefully be formed on the fused silica arc tubes of metal halide lamps in order to inhibit sodium loss and on other discharge lamps required to be ozone free.

4 Claims, 3 Drawing Figures

FUSED SILICA ARTICLE HAVING TITANIA-SILICATE BARRIER ZONE

This application is a division of my application Ser. No. 478,926, filed June 13, 1974, now U.S. Pat. No. 478,926 titled "Metal Halide Lamp with Titania-Silicate Barrier Zone in Fused Silica Envelope."

BACKGROUND OF THE INVENTION

The invention relates to a graded layer or zone at the surface of fused silica for reducing its ultraviolet transmission and which is also useful to inhibit sodium ion diffusion through the walls of silica envelopes.

The ultraviolet transmissivity of fused silica extends well below 180 nanometers. Thus fused silica envelopes transmit both the 184.9 nm. line and the 253.7 nm. line produced by the mercury discharge. The former produces ozone in air which has a germicidal effect and a noticeable odor whereas the latter has an erythemal effect on the skin and is harmful to the eyes. In the usual jacketed mercury or metal halide lamp wherein the fused silica arc tube is enclosed in an outer glass envelope, the ultraviolet emission is contained by the outer envelope. However with unjacketed lamps where the 184.9 or 253.7 nm. radiation or other ultraviolet radiation is objectionable, recourse must be had to envelopes made of filtertype fused silica. Such fused silica is available from Quartz and Silice Company, Paris, France under the names Germisil and Heliosil. Germisil effectively absorbs radiation of wavelength below 250 nm. but is transparent to actinic and bactericidal rays. Heliosil effectively stops all radiation below 280 nm. and may be used to transmit only the near ultraviolet which produces skin tanning without giving rise to erythematous action. These fused silicas are described by the manufacturer as consisting of 99.97% $SiO_2$ with a slight addition of titanium. While perfectly satisfactory for the intended purpose, lamp envelopes made of these special fused silicas are very expensive.

Metal halide lamps for general illumination contain a filling of mercury and light-emitting metals including sodium in the form of halides, commonly the iodide, in fused silica arc tubes enclosed in outer glass envelopes. A problem encountered during operation of these lamps is the slow passage of sodium from the hot arc plasma through the fused silica wall into the cooler region between the arc tube and the outer envelope. The lost sodium can no longer contribute its characteristic emission so that the light output gradually diminishes and the color shifts from white towards blue. Loss of sodium also causes the operating voltage of the lamp to increase and it may rise to the point where the arc can no longer be sustained by the ballast at which point the life of the lamp is ended.

In the past several different types of coatings on fused silica have been tried to reduce sodium ion diffusion. One proposed barrier layer comprised a layer of zirconium oxide upon the inner surface of the arc tube to inhibit sodium diffusion, and a second layer of aluminum oxide over the zirconium oxide to protect the zirconium oxide from the attack of the arc stream. It has also been proposed to provide a radiation absorbing glaze on the outer or inner surface of the quartz arc tube to absorb ultraviolet light. It was reasoned that hydrogen absorbed in the glass of the outer jacket is released by the photochemical effect of ultraviolet light on the glass. Such hydrogen would then diffuse into the hot fused silica arc tube, where it shortens life, makes the lamp more difficult to start, and increases the voltage necessary to sustain the arc discharge. Such coatings have not been sufficiently successful for commerical adoption.

The object of the invention is to provide an improved layer or surface zone in fused silica which will reduce the ultraviolet transmission of the silica and also lower its sodium ion conductivity, and a novel method for forming such layer or zone.

SUMMARY OF THE INVENTION

In accordance with my invention, I provide a glassy titania silicate layer or zone at the surface of fused silica which reduces its ultraviolet transmission and also inhibits its sodium ion conductivity. In fused silica tubes serving as envelopes for electric discharge lamps, when the sodium ion diffusion-inhibiting property is important, the zone should be on the outside of the envelope. The outside is the low temperature side of the container and there may be a difference of 50° or more between inside and outside surfaces. Since the rate of diffusion of sodium ions through fused silica is an exponential function of temperature, a temperature difference of 50° C may entail one order of magnitude, that is a 10 to 1 ratio in the diffusion rates.

Fused silica with such titania containing zone may be used in lieu of filter-type fused silica whenever an envelope which absorbs the shorter ultraviolet radiation is needed.

When the zone is formed on fused silica arc tubes of metal halide lamps, it serves to cut down loss of sodium from the arc tube in two different ways. Firstly, it does so directly as a barrier layer which inhibits sodium ion diffusion. Secondly, it does so by reducing the ultraviolet output from the arc tube which in turn reduces photoelectron emission from metallic parts within the lamp. The photoelectrons accelerate diffusion of ions through the arc tube walls and thus reduction of photoelectrons inhibits sodium ion diffusion.

According to my invention, the titanium silicate layer or zone is formed in a two-step process. The fused silica is first coated with a thick opaque coating of polycrystalline titanium oxide powder. This may be accomplished by any one of several techniques. That which I used was to burn titanium isopropoxide in pure oxygen and to pass the fused silica tube through the smoke emanating from the flame in order to coat it with titania. The second step is to diffuse the titania coating into the silica by surface heating with either an oxyhydrogen flame, a DC arc plasma torch, or an induction heated plasma torch. It is also possible to use a $CO_2$ laser. During fusion, the titania diffuses into the silica surface and becomes an integral part of the structure which becomes clear and transparent.

DETAILED DESCRIPTION

Figure 1:
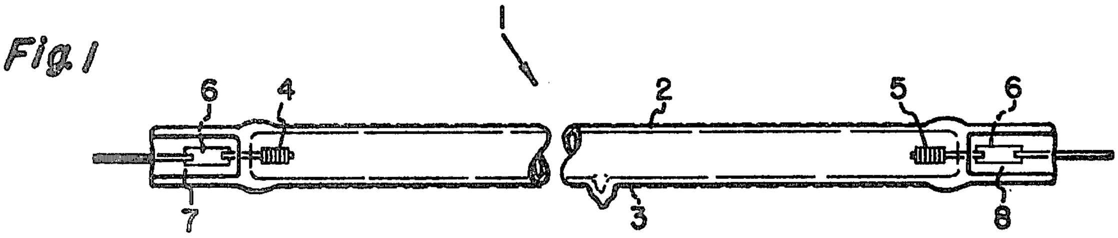
FIG. 1 shows a metal vapor discharge lamp comprising a fused silica arc tube embodying the invention.

Referring to FIG. 1 of the drawing, a metal vapor arc lamp 1 embodying the invention comprises a tubular fused silica envelope 2 having a titania silicate graded layer or zone on its outer surface represented by dashed line 3. The envelope contains a quantity of mercury which is substantially completely vaporized and exerts a partial pressure of several atmospheres during operation. An inert gas at a low pressure, for instance argon at 25 torr, is included in the arc tube to facilitate starting and warm-up. A pair of arcing electrodes 4, 5 are located in the ends of the arc tube. The electrodes are supported on inleads which include intermediate thin molybdenum foil sections 6 hermetically sealed to the flattened ends 7, 8 of the tube, commonly referred to as pinch seals.

Figure 3:
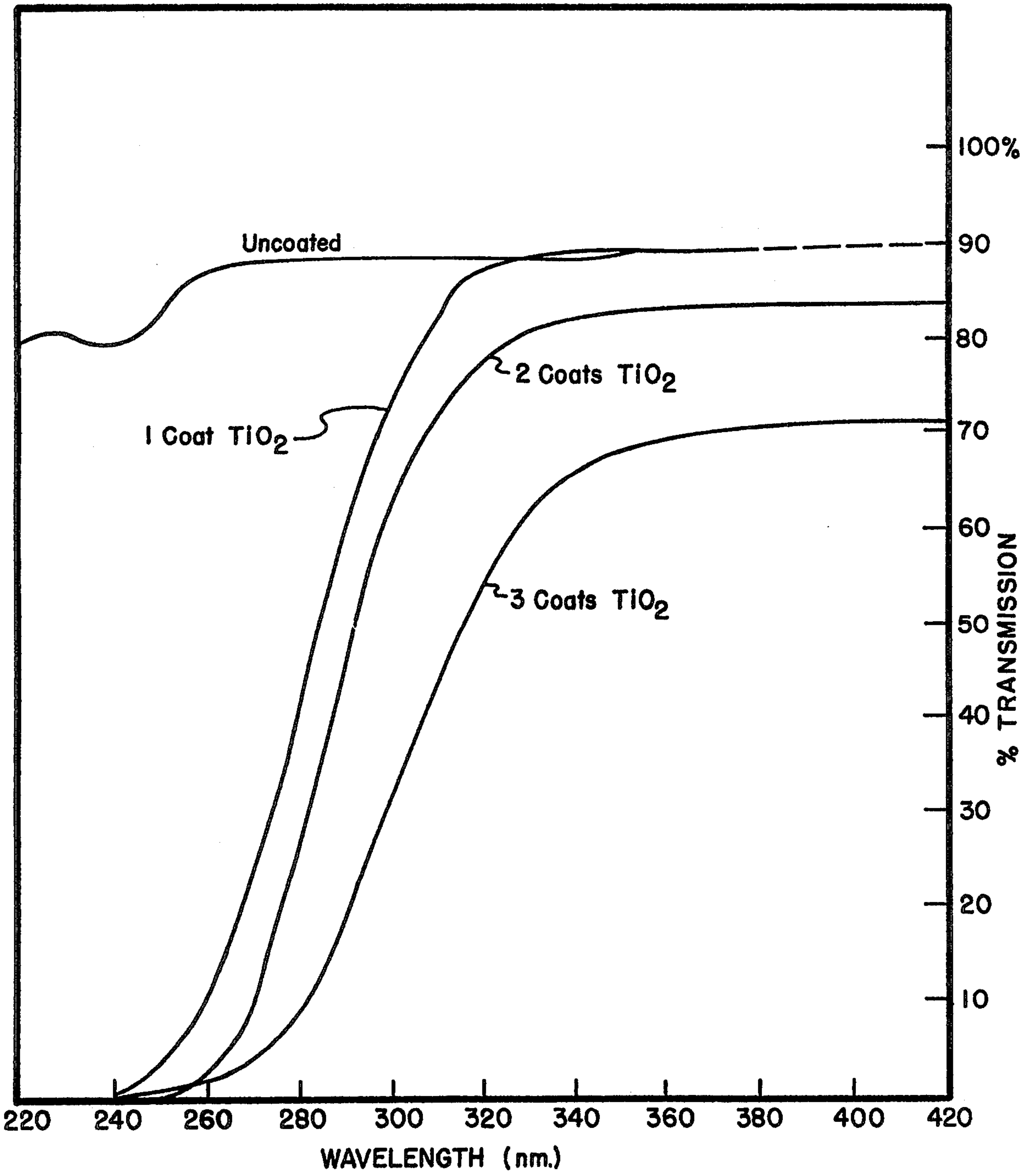
FIG. 3 is a graph showing the variation in transmissivity with wavelength for various numbers of titania coatings.

I have measured the ultraviolet transmission of silica with 1, 2, and 3 coatings of titania heat-diffused into the silica according to the invention, and FIG. 3 shows the percent transmission over the wavelength range from 220 to 420 nanometers. In the following table I have listed the wavelength in the ultraviolet where the transmission drops to 50% for fused silica provided with up to 3 coatings of titania silicate.

| Number of Coatings | Wavelength at 50% Transmission |
|---|---|
| 1 | 285 nm. |
| 2 | 295 nm. |
| 3 | 320 nm. |

The data indicates that the cutoff wavelength, measured as the 50% transmission point, can be shifted to only a slight extent by multiplying the number of coatings.

Figure 2:
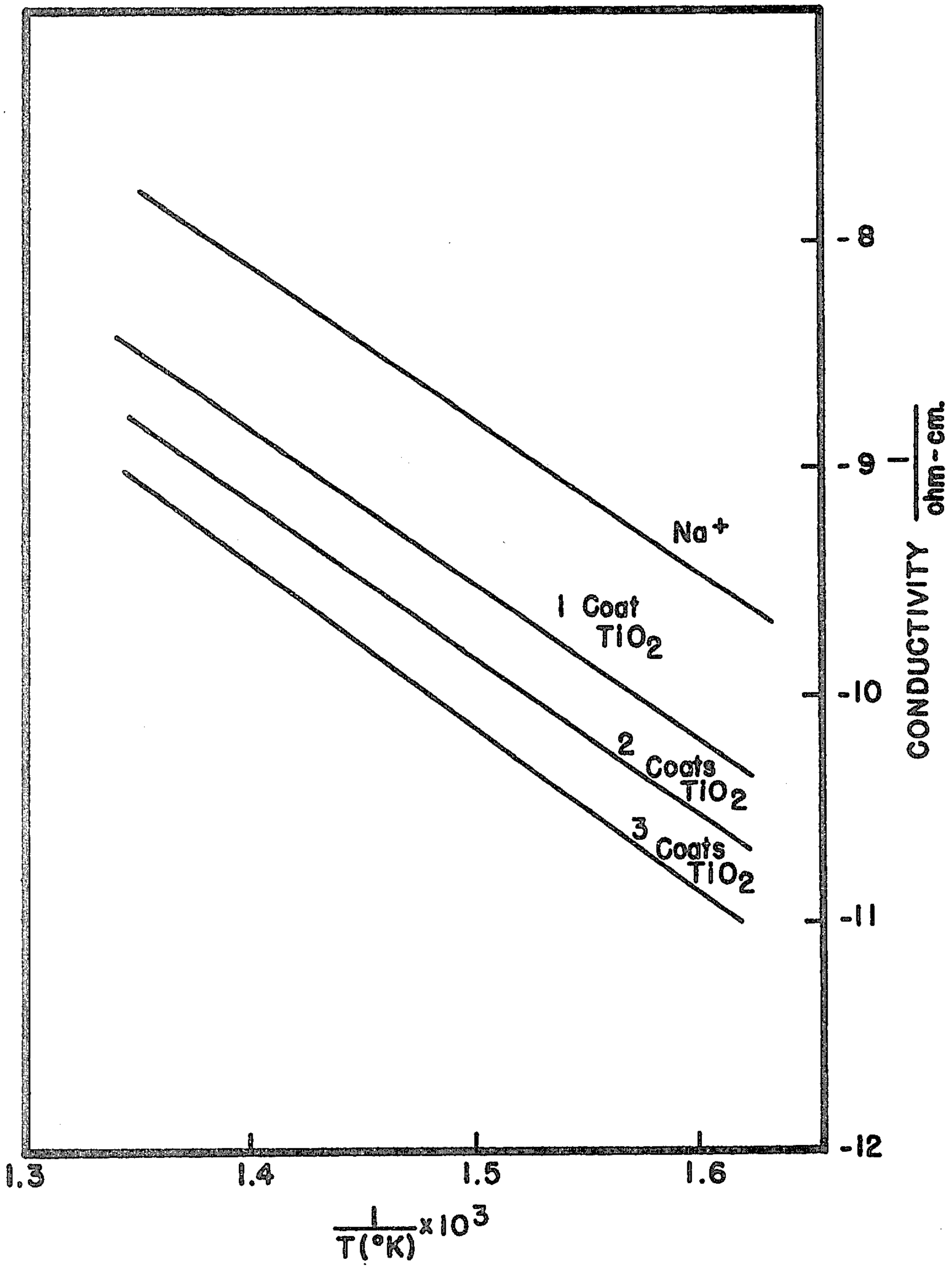
FIG. 2 is a chart giving the sodium ion conductivity as a function of temperature for different numbers of titania coatings diffused into the silica.

I have measured the temperature dependence of the sodium ion conductivity of fused silica with titania silicate coating up to 5000° C, and the results are plotted in the graph of FIG. 2. It will be observed that from the point of view of reducing sodium ion conductivity, there are benefits in multiplying the number of coatings. With three coatings, the sodium ion conductivity is reduced over one order of magnitude.

I have analyzed the zone thickness and titanium concentration by means of an electron beam microprobe. The depth of diffusion of the titanium dioxide into the fused silica is from 1 to 25 microns. The peak concentration of titanium oxide in the diffused layer is from 3 to 20 weight percent.

In a metal halide lamp comprising a fused silica arc tube containing sodium, a layer or zone resulting from the application of three coats of titania on the outside of the silica arc tube has two beneficial effects. The first effect is the direct barrier to sodium ion diffusion which the layer provides. The second effect is the further reduction in sodium ion diffusion rate as a result of reduced ultraviolet output and reduced photoelectron emission from metal parts within the lamp consequent thereon. For lamps where reduced sodium ion diffusion is not of consequence, a one-coat application of titania glass is sufficient for reducing the ultraviolet transmission.

What I claim as new and desire to secure by Letters Patent of the United States is:

1. The method of treating fused silica to inhibit sodium ion diffusion therethrough and to reduce ultraviolet transmission which comprises coating the fused silica with an adherent visible layer of titanium oxide, and then diffusing said titanium dioxide into the silica by surface-heating the silica to a very high temperature.

2. The method of claim 1 wherein the fused silica is coated by passing it through the smoke of titanium isopropoxide burning in oxygen to form a thick opaque polycrystalline titania powder layer on the fused silica, and then surface-heating said opaque layer to a temperature sufficient to heat-diffuse it into the fused silica to the point where the fused silica is again clear and transparent.

3. Fused silica comprising a surface layer inhibiting sodium ion diffusion and reducing ultraviolet transmission, said layer having titanium oxide diffused into the silica to a depth from 1 to 25 microns and forming titanium silicate therein.

4. Fused silica as in claim 3 wherein the maximum concentration of titanium oxide in the diffused layer is from 3 to 20 weight percent.

* * * * *